H. CAVE AND J. L. ANDERSON.
FLAME PROJECTOR APPARATUS.
APPLICATION FILED APR. 27, 1918.

1,340,012.

Patented May 11, 1920.
5 SHEETS—SHEET 1.

INVENTORS
BY *Henry Cave and James L. Anderson*
*ATTORNEY.*

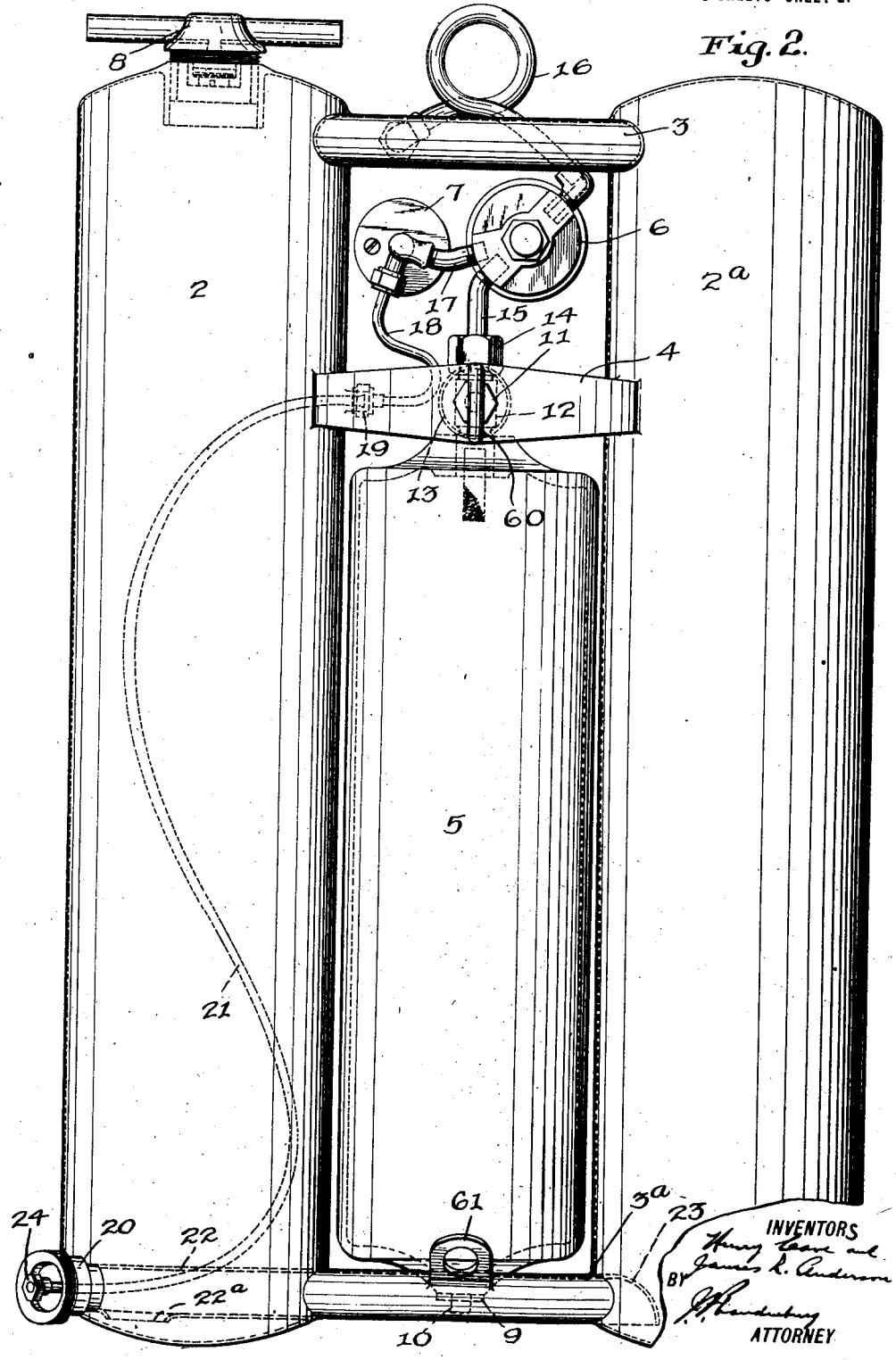

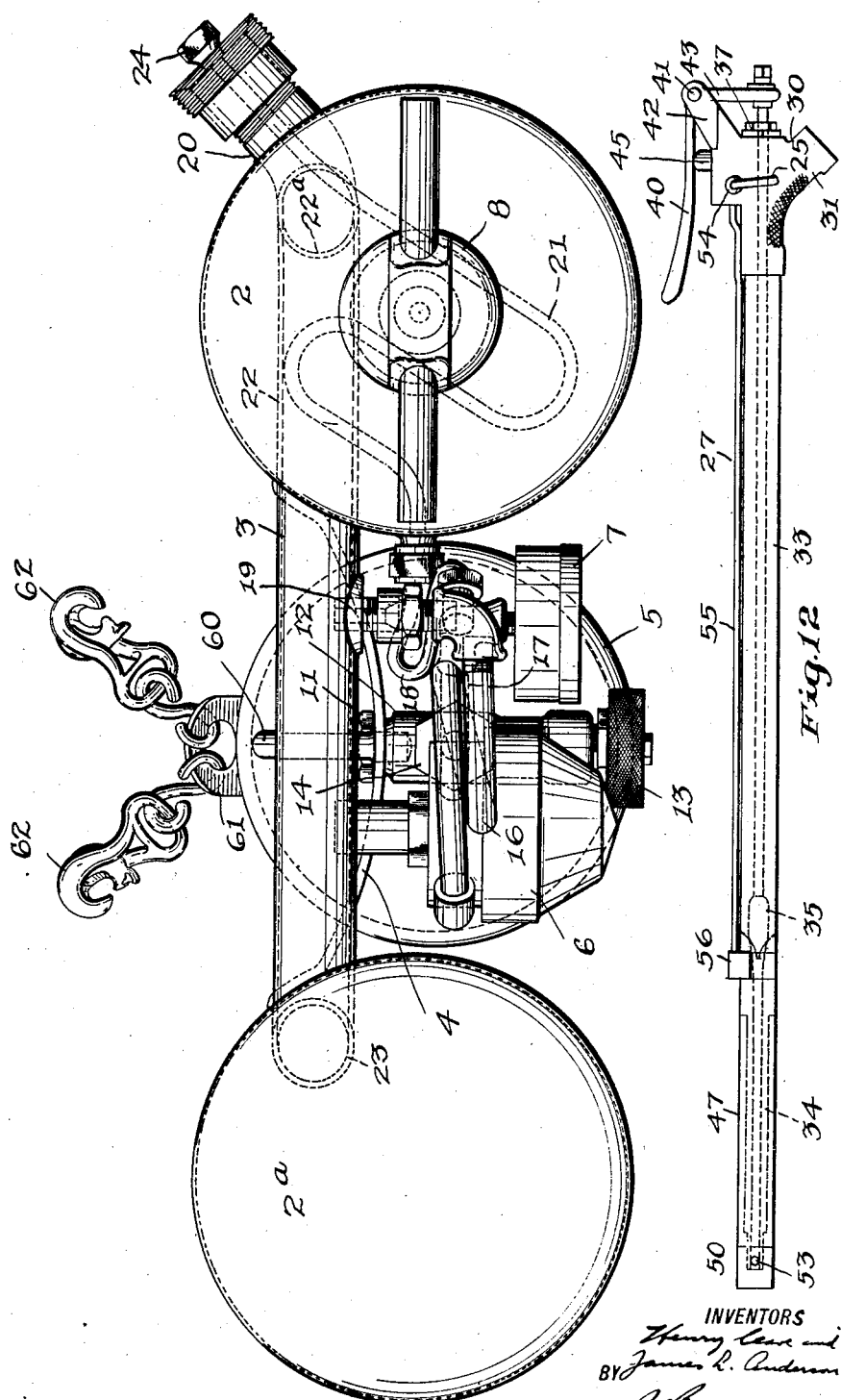

H. CAVE AND J. L. ANDERSON.
FLAME PROJECTOR APPARATUS.
APPLICATION FILED APR. 27, 1918.
1,340,012.
Patented May 11, 1920.
5 SHEETS—SHEET 4.
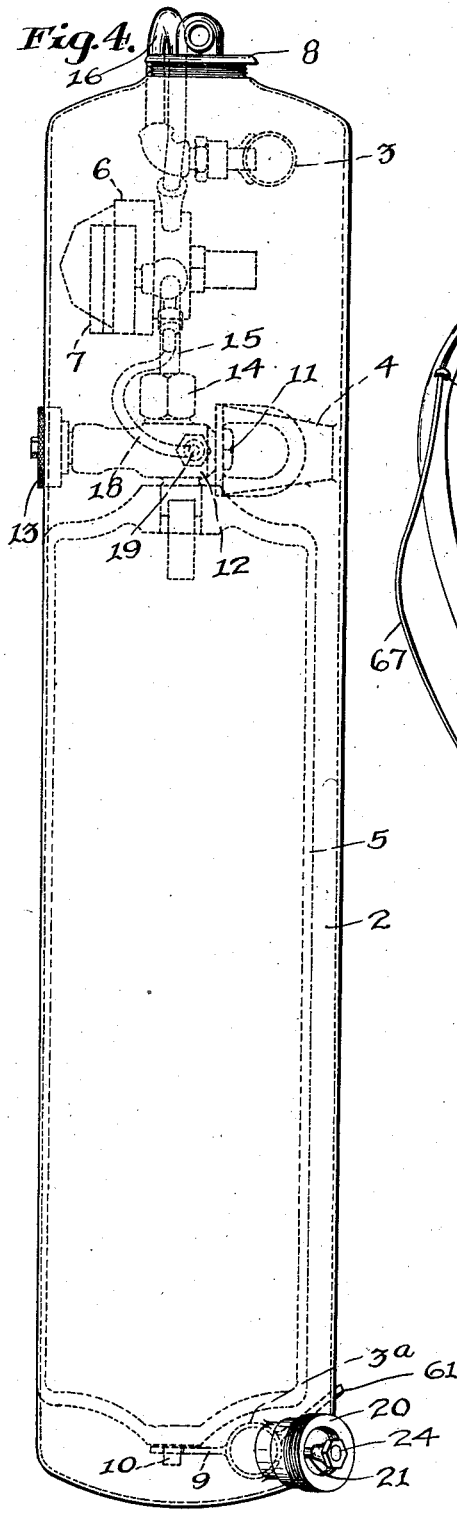
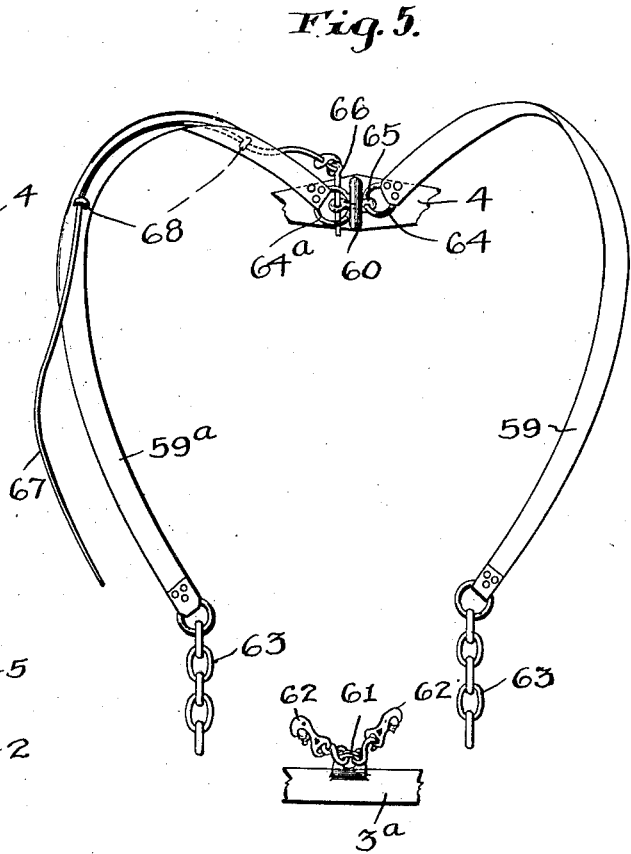
INVENTORS
ATTORNEY

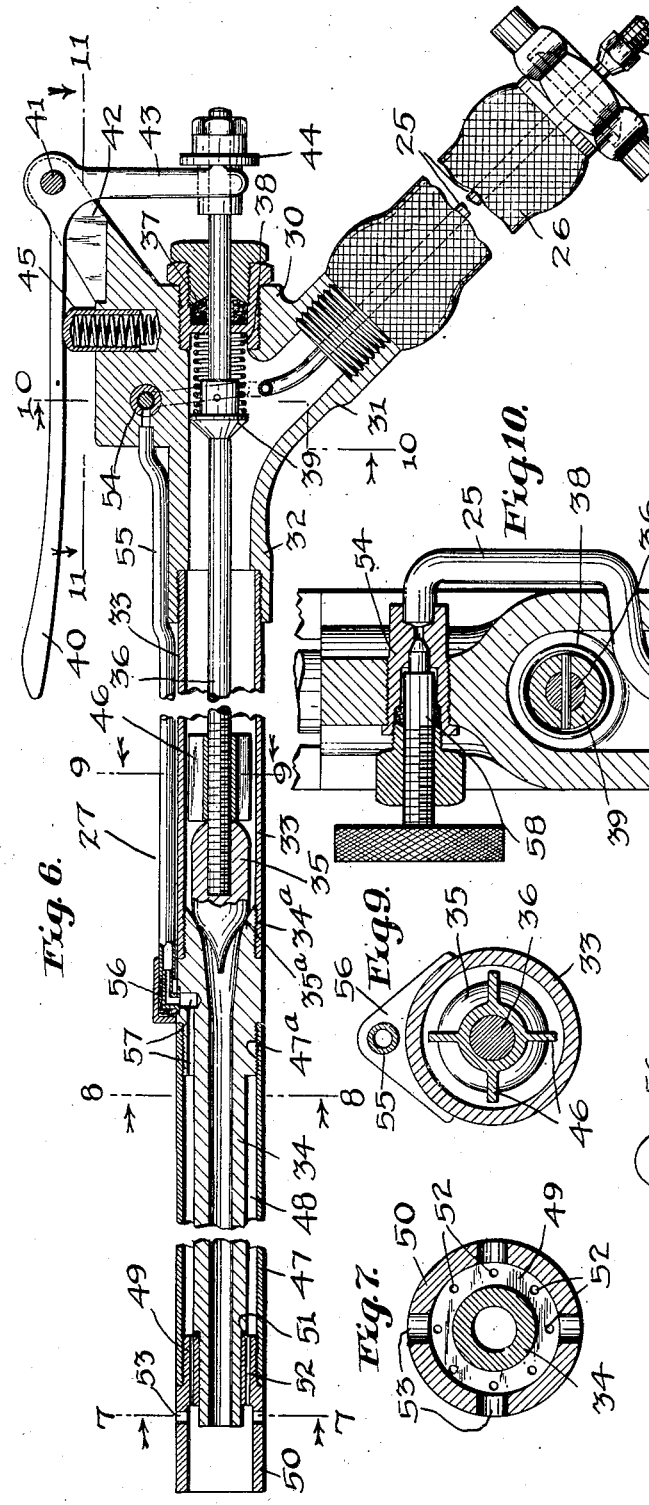

UNITED STATES PATENT OFFICE.

HENRY CAVE, OF ELIZABETH, AND JAMES L. ANDERSON, OF BAYONNE, NEW JERSEY, ASSIGNORS TO DAVIS-BOURNONVILLE COMPANY, OF NEW YORK, N. Y., A CORPORATION OF NEW YORK.

FLAME-PROJECTOR APPARATUS.

1,340,012.      Specification of Letters Patent.      Patented May 11, 1920.

Application filed April 27, 1918. Serial No. 231,290.

*To all whom it may concern:*

Be it known that we, HENRY CAVE and JAMES L. ANDERSON, citizens of the United States, and residents, respectively, of Elizabeth, in the county of Union and State of New Jersey, and of Bayonne, in the county of Hudson and State of New Jersey, have invented certain new and useful Improvements in Flame-Projector Apparatus, of which the following is a specification.

The invention relates to flame-projector or liquid-fire apparatus used in warfare. One part of the invention is a multiple tank structure to be transported on the back, the object therein being so to arrange and distribute a substantial storage capacity as to secure maximum ease in carrying and comparative lightness with strength in the construction. A further object is to provide improved carrying arrangements for the tanks, the same including a harness having two straps and a quick-detaching means for casting off both at a common point. The invention also comprises a flame-projector gun embodying numerous improvements hereinafter described and pointed out, having for their objects, among others, to increase the ease of operation and the effectiveness of the discharge, to reduce wastage of oil, and to secure a simple, durable and easily repaired construction. A feature of the invention is the utilization of the same supply of gas for propelling the oil and for igniting the stream as it leaves the gun; and still another object is to provide for the protection of the flexible ignition line without special means for the purpose, this being accomplished by leading the said line through the interior of the oil system. Other features and advantages will become apparent as the specification proceeds.

In the drawings:

Fig. 2 is a front elevation of the tank structure;

Fig. 3 is a plan view thereof;

Fig. 4 is a side elevation;

Fig. 5 is a front view of the harness, showing also the connections of the tank structure;

Fig. 6 is a longitudinal section through the gun, intermediate portions thereof and of the flexible supply connections being broken away for economy of space;

Fig. 7 is a cross-section on the line 7—7 of Fig. 6;

Fig. 8 is a cross-section on the line 8—8 of Fig. 6;

Fig. 9 is a cross-section on the line 9—9 of Fig. 6;

Fig. 10 is a cross-section on the line 10—10 of Fig. 6;

Fig. 11 is a horizontal section on the line 11—11 of Fig. 6; and

Fig. 12 is a side elevation of the gun.

Figure 1:
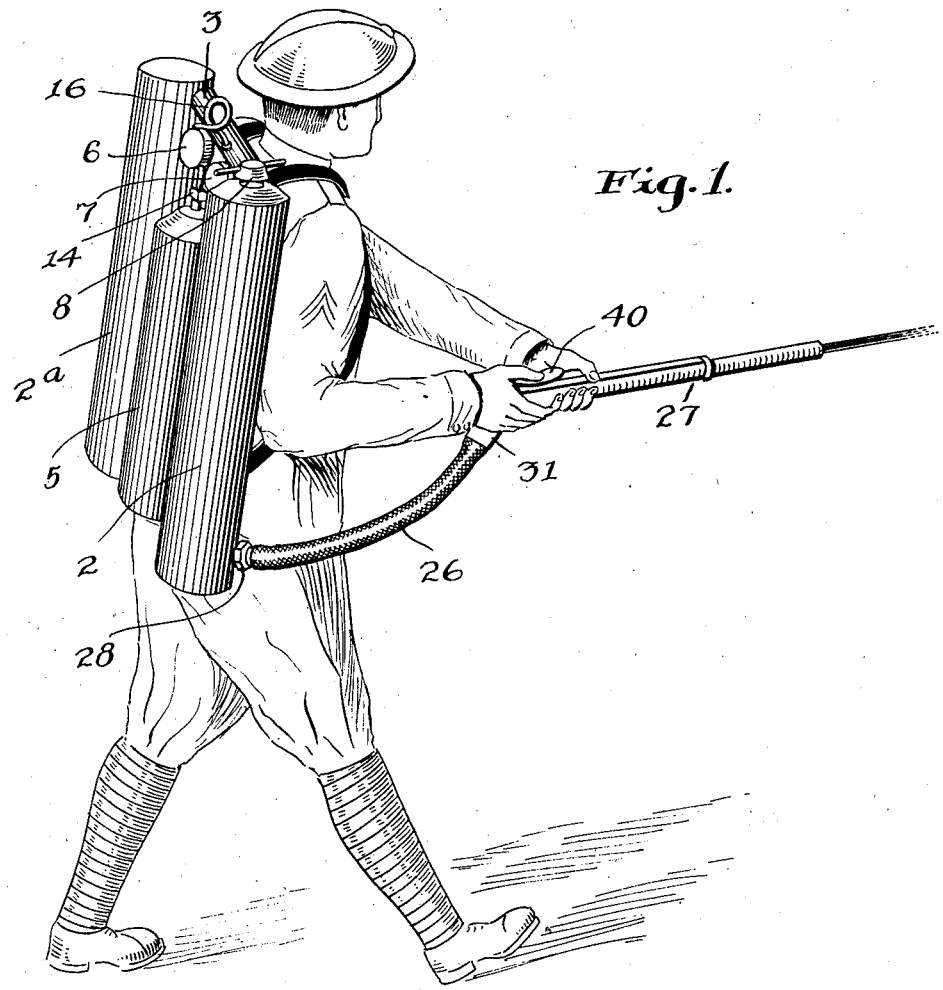
Figure 1 is a perspective view of the complete apparatus in use.

The oil receptacle consists of laterally-spaced cylindrically-elongated twin tanks 2, $2^a$ connected at top and bottom by hollow legs 3, $3^a$, constituting both mechanical connections and means of communication between the interiors. The said tanks are further united at an intermediate point above the center by a strut 4. The legs and the strut are both preferably located forwardly of the vertical central transverse plane, and the strut is desirably bowed in toward this plane, as seen in Fig. 3. By this division of the oil holder a given storage capacity and resistance to internal pressure can be obtained more easily and with less weight of metal than in the case of a single tank; furthermore, the weight is better distributed for carrying.

In the space between the oil tanks, an upright hydrogen tank 5 is inserted. This tank is preferably set back somewhat from the front lines of the oil tanks and is of less vertical height, the space above the hydrogen tank and between the upper portions of the oil tanks being utilized to accommodate a regulator 6, a gage 7, and suitable connections. Whereas the oil tanks are permanently united, the hydrogen tank is removable, so that when exhausted it may be taken out and replaced with a charged flask. The oil tanks are filled through a top opening in the tank 2 controlled by a cap 8. The lower end of the removable hydrogen tank 5 stands upon a foot-rest bracket 9, which projects rearward from the bottom leg $3^a$, the bottom of the tank having a peg 10 which enters an opening in the foot-rest. At its upper end the hydrogen tank is rigidly and detachably secured by means of a screw 11, which passes through the center of the strut 4 into a tapped opening in the outlet fitting 12. This fitting is provided with a needle valve 13 and receives a detachable coupling 14 on the end of a short pipe 15 leading to the pressure regulator 6. A conduit 16 is connected at one end with the reduced pressure side of the regulator and at the other end with the upper leg 3, so as to introduce pressure in the upper portions of both oil tanks. Another pipe section 17 leads from the reduced pressure side of the regulator to the gage 7, from which there extends a conduit 18, which is connected at 19 with an opening in the wall of the oil tank 2. This tank has an oil outlet connection 20 at the bottom, and a flexible metal gas conduit section 21 leads thereto through the interior of the tank from the coupling 19, by which it is tightly connected with the conduit section 18.

The conduit 21 extending within the tank 2 but not communicating therewith is part of an ignition line. Terminating in a suitable coupling member 24 accessible at the oil outlet 20, it is adapted to be connected with another section 25 of said ignition line which passes lengthwise through a hose 26 which conducts the oil to the gun 27. The tank end of the hose is furnished with a coupling member 28 to engage the outlet fitting 20, and similarly the end of the ignition conduit section 25 carries a coupling member 29 for attachment to the coupling member 24.

A tube 22 extending across the bottom of the tank 2 from the leg 3$^a$ to the outlet 20 and having a bottom inlet 22$^a$, together with a down-turned inlet 23 in the tank 2$^a$ at the opposite end of the leg 3$^a$, insure the expulsion of practically all the liquid from the twin tanks.

The gun which is illustrated more particularly in Figs. 6 to 11 has a butt casting 30 formed with a rearwardly inclined inlet branch 31 on its under side, to which the hose 26 is connected and through which the ignition line enters. Screwed in the forwardly extending tubular portion 32 of said butt portion is a tube 33 constituting a barrel section of adequate length. The elongated liquid-throwing nozzle 34 which forms the terminal portion of the barrel is made separately and screwed at 34$^a$ into the forward end of the tube 33, its length and internal diameter and the taper and curvature of the entrance portion of its bore being established in accordance with known laws.

The discharge from the gun is controlled by a longitudinally movable internal valve member 35 having its forward portion rounded and tapered to enter the inlet of the nozzle bore and to close directly upon the basal convexity 35$^a$ thereof as a valve seat. This not only avoids the provision of a special valve seat but brings the valve as far forward as it can be placed, thus reducing to a minimum the amount of oil cut off and lost in the outer part of the gun when the valve is closed after a period of use.

The valve is screwed upon the front end of a rod 36, which extends longitudinally rearward through the barrel, to and through a stuffing-box 37 at the rear end of the butt casting 30. A compression spring 38 inside the butt interposed between the stuffing-box and a collar 39 fast on the rod serves to force the rod and valve forward to close the outlet from the gun. Opening of the valve against the action of the spring is effected by means of a grip 40 extending lengthwise outside of the rear part of the gun and adapted to be operated by squeezing toward the axis thereof by the hand which grasps this region. In the preferred embodiment the grip is disposed at the top and forms the long arm of a bell-crank lever which is fulcrumed at 41 on a bracket 42 projecting upward and rearward from the butt. The short arm 43 of the bell-crank extends across the rear of the gun and is bifurcated to embrace the projecting end of the rod 36 in front of a collar 44 thereon, by which the movement of the bell-crank is transmitted to the rod to unseat the valve. When pressure is removed from the grip the spring 38 automatically closes the valve, and could also restore the grip lever, but it is preferable to provide a separate spring plunger 45 for the latter.

Longitudinal wings 46 are mounted upon the forward part of the rod 36 immediately behind the valve member 35, these wings having a double function, namely to guide the valve and to prevent swirling of the liquid. As it approaches its seat the valve is also guided by the coöperation of its tapered extremity with the flared entrance 35$^a$ of the bore of the nozzle.

A jacket tube 47 is screwed at 47$^a$ at its rear end upon a threaded zone on the nozzle, in front of which the external diameter of the nozzle is reduced so as to leave an annular gas chamber 48. Said chamber is partly closed at the front by the rear extension 49 of a wind-shield 50, which is screwed into the jacket tube 47 and against a forward shoulder 51 on the nozzle and provided with a circular series of fine jet holes 52 extending from the annular gas chamber to the interior of the shield slightly behind the end of the nozzle. The wind-shield itself extends forwardly of the nozzle, from which its wall is laterally spaced, and is provided at the base with a number of transverse air inlets 53.

The ignition pipe 25 passes outward through the wall of the butt portion of the gun and is connected with a needle valve casing 54 on top, from which another small diameter pipe section 55 extends forward along the barrel to the portion of the nozzle 34 just in front of the valve 35 which is exposed between the tubes 33 and 47. Here it is connected with a fitting 56, from which intersecting bores 57 in the wall of the nozzle admit the gas to the chamber 48. In this way the ignition gas, preferably hydrogen, is led from the propellent tank 5, through but out of communication with the oil storage and conducting system, wherein it is protected, to the gun, where it issues as a series of jets around the exit of the oil nozzle. The needle valve 58 in the needle valve casing 54 of the gun enables the ignition jets to be turned on and off and to be adjusted.

The tank structure is supported upon the back by a harness shown particularly in Fig. 5. Said harness comprises a pair of straps 59, 59ª, which pass over the shoulder and down below the arms. Their upper ends are connected with an eye 60 projecting from the strut 4 and their lower ends with another eye 61 on the leg 3ª. At the latter point adjustment as to length may be secured by means of snap hooks 62 secured to the eye 61 and engageable selectively with the links of chain lengths 63 constituting extensions of the straps. At their upper ends the straps carry rings 64, 64ª. A link 65 is secured to the ring 64 and passes through the eye 60 and the other ring 64ª, and a pin 66 is passed through the opening in the free end of the link in such manner as to form a detachable coupling between the same and the ring 64ª. As long as this pin is in place the straps remain connected with each other and with the upper attachment member 60 of the tank structure, but withdrawal of the pin will release both straps, thus enabling the soldier quickly to free himself of his burden. Removal of the pin is effected by pulling upon a thong 67 passing over the shoulder and down in front through guides 68 on the strap 59ª.

The operation will now be briefly described.

It is to be understood that the twin oil tanks are filled with an inflammable liquid and that the central propellent tank contains a gas, such as hydrogen, under relatively high pressure. This gas preferably serves both to drive and to ignite the oil, but in cases where other means of ignition may be employed, it will be obvious that the gaseous fluid in the propellent tank need not be inflammable and might be of any suitable character.

The gun is connected up with the tank structure, as shown in Fig. 1. In this condition two lines lead from the tank structure to the gun, one of these being the oil hose and the other the ignition line which is housed within the oil storage and conducting system and has its outlet at the discharge end of the gun nozzle. Preparatory to action the propellent tank valve 13 is opened and the pressure regulator 6 is set to maintain the desired pressure for the oil tanks and the ignition line. The ignition valve 58 of the gun is next opened to the desired extent and the hydrogen jets issuing at the end of the gun are lighted. Finally, the operator opens the valve 35 by pressing upon the grip 40, whereupon the oil previously held under pressure behind this valve is forced through the liquid-throwing nozzle, is ignited as it emerges, and is projected as a blazing stream for a substantial distance. Whenever the operator releases the grip at the butt of the gun, the main valve is reseated and the flow of oil cut off. The hydrogen jets, however, will continue to burn until such time as the valve 58 is closed, thus serving as a pilot flame to re-ignite the oil stream when it is again turned on.

What we claim as new is:

1. In flame-projector apparatus, a portable tank unit comprising a pair of interconnected oil tanks and a propellent tank between and connected with the interiors of the oil tanks.

2. In flame-projector apparatus, a portable tank unit comprising a pair of oil tanks, means uniting said tanks in spaced relation and interconnecting their interiors at top and bottom, a propellent tank adapted to occupy the space between the joined oil tanks, and means for removably supporting the propellent tank on the oil tank structure.

3. In flame-projector apparatus, a portable tank unit comprising a pair of oil tanks, means uniting said tanks in spaced relation and interconnecting their interiors at top and bottom, and a central propellent tank supported on the connections between the oil tanks.

4. In flame-projector apparatus, a portable tank unit comprising a pair of oil tanks, upper and lower hollow legs connecting said tanks in spaced relation, an intermediate strut also connecting the oil tanks, and a central propellent tank supported by said strut and the lower one of said legs.

5. In flame-projector apparatus, a portable tank unit comprising a pair of spaced interconnected oil tanks, rigid connections between said tanks, a foot-rest on the lower of said connections, a central removable propellent tank having means at the bottom to engage said foot-rest, and means for securing the propellent tank laterally to an upper one of said connections.

6. In flame-projector apparatus, a portable tank unit comprising a pair of oil tanks, upper and lower hollow legs connecting said tanks in spaced relation, an intermediate strut also connecting the oil tanks, a propellent tank removably mounted between the oil tanks, means for securing the propellent tank to the strut, and a connection upon the strut for attachment of a carrying harness.

7. In flame-projector apparatus, a portable tank unit comprising a pair of oil tanks, upper and lower hollow legs connecting said tanks in spaced relation, an intermediate strut also connecting the oil tanks, a central propellent tank connected to the strut and the lower leg, and connections upon said strut and leg for attachment of a carrying harness.

8. In a flame-projector apparatus, the combination of an oil tank, a discharge conduit leading therefrom, a gas tank, and an ignition conduit leading from the gas tank into the interior of the oil tank and thence outward through the discharge conduit.

9. In a flame-projector apparatus, the combination with a source of supply of combustible liquid, a flame-projector gun, and a flexible conduit for leading said liquid to the gun, of a source of supply of gas for ignition, and an ignition conduit passing through the interior of said liquid conduit to the gun.

10. In a flame-projector apparatus, the combination with a flame-projector gun, and an oil tank connected therewith, of a gas tank, a propellent connection between the gas tank and the upper part of the oil tank, and an ignition connection passing from the gas tank to the gun.

11. In a flame-projector apparatus, the combination with a flame-projector gun, an oil tank, and a hose for conducting the oil from said tank to the gun, of a gas tank, a propellent connection from the gas tank to the upper part of the oil tank, and an ignition conduit leading from the gas tank through the interior of the oil tank and the oil hose to the gun.

12. A flame projector gun comprising a barrel terminating in a nozzle and having means at the rear for connection with a source of supply of liquid fuel under pressure, a valve seat in the barrel and a spring-seated valve movable longitudinally toward and from the valve-seat, a rod extending rearward in the barrel from the valve, and a valve-opening lever at the rear of the gun connected with said interior rod, said lever having a grip disposed alongside the rear handle portion of the gun and adapted to be operated by squeezing toward the axis thereof.

13. A flame-projector gun comprising a barrel terminating in a nozzle and having means at the rear for connection with a source of supply of liquid fuel under pressure, a valve seat in the barrel and a spring-seated valve movable longitudinally toward and from the valve-seat, a rod extending rearward in the barrel from the valve, and a valve-opening lever fulcrumed at one side of the rear portion of the gun and having a forwardly extending grip arm adapted to be operated by squeezing and a transverse arm connected with said rod.

14. A flame-projector gun comprising a barrel terminating in a nozzle and having means at the rear for connection with a source of supply of liquid fuel under pressure, a valve seat in the barrel and a spring-seated valve movable longitudinally toward and from the valve-seat, a rod extending rearward in the barrel from the valve and projecting beyond the rear end of the gun, means at the rear of the gun producing a tight sliding joint with the rod, a bracket projecting at one side of the rear end of the gun, and a bell-crank valve opening lever fulcrumed on said bracket and having a forwardly extending grip arm and a transverse working arm acting upon the projecting rear end of the rod.

15. A flame-projector gun comprising a barrel terminating in a nozzle and having means at the rear for connection with a source of supply of liquid fuel under pressure, a longitudinally extending rod inside the barrel, a valve upon the forward end of the rod, a spring acting upon the rear portion of the rod to close the valve, and a bell-crank lever connected with the rod in rear of the spring for opening the valve.

16. A flame-projector gun comprising a barrel terminating in a nozzle and having means at the rear for connection with a source of supply of liquid fuel under pressure, a longitudinally extending rod inside the barrel, a valve upon the forward end of the rod, longitudinal wings upon the rod directly behind the valve, and operating means connected with the rear of the rod.

17. A flame-projector gun comprising a barrel terminating in an elongated liquid-throwing nozzle, means for supplying oil under pressure to the barrel, a jacket tube around the nozzle forming an annular ignition gas chamber, means for supplying ignition gas to said chamber, and a wall at the front end of the ignition gas chamber perforated with a number of jet holes adjacent the delivery orifice of the nozzle.

18. A flame-projector gun comprising a barrel terminating in an elongated liquid throwing nozzle, means for supplying oil under pressure to the barrel, a jacket tube around the nozzle forming an annular ignition gas chamber, means for supplying ignition gas to said chamber, a wind-shield around the forward end of the nozzle, and a wall at the front end of the ignition gas chamber perforated with a number of jet holes delivering into the wind-shield inclosure around the extremity of the nozzle.

19. A flame-projector gun comprising a barrel section, means for supplying the same with oil under pressure, an elongated liquid-throwing nozzle secured to said barrel section, a jacket tube on the nozzle inclosing an annular ignition gas chamber, means for supplying said chamber with ignition gas, and a member inserted between the nozzle and the jacket tube at the front and perforated with jet holes around the delivery orifice of the nozzle.

20. A flame-projector gun comprising a barrel terminating in an elongated liquid-throwing nozzle, means for supplying oil under pressure to the barrel, a jacket tube around the nozzle forming an annular ignition gas chamber, means for supplying ignition gas to said chamber, and a windshield at the front end of the nozzle having an annular rear extension inserted between the nozzle and jacket tube and perforated with jet holes.

HENRY CAVE.
JAMES L. ANDERSON.